United States Patent
Anderson et al.

(10) Patent No.: US 7,295,894 B2
(45) Date of Patent: Nov. 13, 2007

(54) METHOD FOR INITIALIZING A POWER-ACTIVATED ADJUSTING DEVICE AND DEVICE FOR IMPLEMENTING SAID INITIALIZATION METHOD

(75) Inventors: Barry Anderson, Suwanee, GA (US); Ping Ran, Shanghai (CN)

(73) Assignee: Siemens Aktiengesellschaft, Munich (DE)

( * ) Notice: Subject to any disclaimer, the term of this patent is extended or adjusted under 35 U.S.C. 154(b) by 122 days.

(21) Appl. No.: 10/859,579

(22) Filed: Jun. 2, 2004

(65) Prior Publication Data

US 2004/0249513 A1 Dec. 9, 2004

(30) Foreign Application Priority Data

Jun. 6, 2003 (DE) ............... 103 25 890

(51) Int. Cl.
*G05B 13/00* (2006.01)
*H02P 3/00* (2006.01)

(52) U.S. Cl. ................. 700/275; 318/468
(58) Field of Classification Search ........... 700/275, 700/28, 54; 318/286, 468, 466, 467; 701/49; 702/41

See application file for complete search history.

(56) References Cited

U.S. PATENT DOCUMENTS

| | | | | |
|---|---|---|---|---|
| 4,468,596 A | 8/1984 | Kinzl et al. | ............ | 318/287 |
| 5,483,135 A | 1/1996 | Parks | ............ | 318/469 |
| 5,585,702 A * | 12/1996 | Jackson et al. | ............ | 318/266 |
| 6,456,027 B1 * | 9/2002 | Pruessel | ............ | 318/445 |
| 6,870,339 B2 | 3/2005 | Kessler et al. | ............ | 318/468 |
| 2003/0051555 A1 * | 3/2003 | Fukumura et al. | ............ | 73/760 |
| 2003/0146724 A1 | 8/2003 | Kessler et al. | ............ | 318/434 |

FOREIGN PATENT DOCUMENTS

| | | | |
|---|---|---|---|
| DE | 3034118 A1 | 8/1982 | |
| DE | 3303 590 A1 | 8/1984 | |
| DE | 195 14 954 A1 | 12/1995 | |
| DE | 19633941 | * | 2/1998 |
| DE | 196 33 941 C2 | 12/1998 | |
| DE | 100 34 014 A1 | 2/2002 | |
| EP | 0 927 447 B1 | 9/1997 | |

* cited by examiner

*Primary Examiner*—Leo Picard
*Assistant Examiner*—Steven R. Garland
(74) *Attorney, Agent, or Firm*—Baker Botts L.L.P.

(57) ABSTRACT

To determine adjusting force comparison values for limiting the actuating force of a power-activated adjusting device by means of control technology, an initialization routine is predefined in a control unit, which allows the adjusting device to run through a specific number of complete adjusting cycles, before the recorded actuating force values are stored in the control unit as adjusting force comparison values.

8 Claims, 3 Drawing Sheets

METHOD FOR INITIALIZING A POWER-ACTIVATED ADJUSTING DEVICE AND DEVICE FOR IMPLEMENTING SAID INITIALIZATION METHOD

PRIORITY

This application claims priority to German application no. 103 25 890.6 filed Jun. 6, 2003.

TECHNICAL FIELD OF THE INVENTION

The invention relates to an adjusting device and a method for initializing a power-activated adjusting device, with which the adjusting force generated by a drive unit is controlled/regulated by a control unit as a function of adjusting force comparison values stored in a storage medium.

BACKGROUND OF THE INVENTION

The adjusting force comparison values thereby serve in particular for the identification of failures, such as for example blocking by an external influence, during operation. For this, the current actuating force is detected as a function of the adjusting path of the actuating element during the respective adjusting operation and compared with the associated adjusting force comparison value. If the currently measured value of the actuating force deviates from the adjusting force comparison value at the current actuating element position beyond and in some cases predefined tolerance limit, this is identified as a failure by the control unit. Once a failure has been identified, predefined failure routines can be started.

Adjusting devices thus known are preferably deployed in the field of vehicle engineering, where power-activated adjusting devices are increasingly deployed for example to enhance user-friendliness. Interactions or at least possible points of contact frequently exist here between the adjusting device and people. Particular examples of these are adjustable vehicle windows that can be controlled electromotively, pneumatically or hydraulically, roofs with a slide/lift mechanism, convertible roofs, vehicle doors, cover systems, vehicle seats, personal restraint systems, running gear components or similar moving vehicle components, in land, air and water vehicles.

But the inventive method can also be deployed in other areas of mechanical engineering. Examples of this are operator protection devices on production machines and electrically, hydraulically or pneumatically operated gates, doors, windows of hangars, houses, rooms, enclosures or elevators.

Here it is principally the failures of relevance to personal safety that are protected against with the adjusting operation. Such a failure occurs for example when body parts are trapped between the pane and frame during the automatic closing operation of an electromotively operated window closing system in a vehicle. Personal safety has to be ensured here by limiting the trapping forces during closing operations to a value which cannot result in personal injury.

A window closing system with an anti-trapping safety circuit for automobiles or similar vehicles is for example known from automotive engineering (DE 33 03 590 C2). This window closing system comprises an electronic power meter for continuous measurement of the power input of the drive motor and a storage medium, in which a power-travel diagram is stored. A power tolerance limit is assigned to the power-travel diagram so that if the power exceeds the predefined tolerance limit, the power flow direction at the driving electric motor is interrupted or reversed.

A window closing unit is also known from patent document DE 196 33 941 C2, with which the motor power is used to calculate the drive force, which is recorded in a diagram as a function of the respective travel position and stored in a storage unit, when the closing part, in particular the window or sliding roof, is closed for the first time after manufacture of the vehicle. This means that, during subsequent movement operations of the closing part during standard operation, such a motor power can be set that the motor force corresponds exactly to the friction force required in each instance. The friction force is then increased by the permissible trapping force for final activation of the electric motor of the positioning drive.

Ever more stringent requirements are increasingly being specified for effective anti-trapping protection between a vehicle part closing by means of a motor-driven power activation and a countering barrier. According to said requirements the closing operation must be terminated for example or the window, partition wall or roof component system must be driven in the reverse direction before it applies a force of 100 Newton or more.

The trapping force is thereby defined as the excess drive force, which exceeds the actuating force required to overcome the static and/or dynamic counterforces (e.g. friction force) inherent in the system to adjust the actuating element. Non-linearities in the transmission of force between the drive and the actuating element and fluctuations in the counterforces along the adjusting path mean that a non-constant actuating force is required along the adjusting path, which is designated here as an actuating force graph.

In the case of the device known from DE 196 33 941 C2, an actuating force graph is recorded during the first closing operation and then stored as a friction force/travel diagram in the storage device of the controller and used to regulate the drive. The drive is now controlled so that the overall drive force at each point of the adjusting path corresponds to the actuating force predefined by the friction force/travel diagram plus the predefined value for the maximum permissible trapping force. If the minimum adjusting force required is then reduced after the friction force/travel diagram has been defined, for example due to the run-in response of the transmission mechanism, the trapping force increases by the corresponding value and in some cases exceeds the limit value.

In order therefore to be able to guarantee the required trapping force limit values, it is essential to predefine or determine adjusting force comparison values along the adjusting path as precisely as possible. This is however complicated by the non-linearities in the transmission of power, e.g. of a transmission mechanism, between the drive, e.g. an electric motor, and the actuating element, e.g. a vehicle window. These non-linearities are caused by kinematic factors of the power transmission mechanism as a function of the adjusting path and by friction forces inherent in the system that fluctuate over the adjusting path and counteract the actuating force. A further problem with the precise predefinition or determination of the adjusting force comparison values results from the fluctuations due to the tolerances required by production technology in the friction forces inherent in the system within a production run and the run-in response of the entire kinematic arrangement from the drive unit to the actuating element.

SUMMARY OF THE INVENTION

The object of the invention is to provide adjusting force comparison values for every individual adjusting device in the final assembly state, which correspond as closely as possible to failure-free operation under standard conditions as specified.

This object can be achieved by a method for initializing an adjusting device, which comprises a power-activated actuating element, a control unit with at least one electronic storage medium and a drive unit, whereby an adjusting force generated by the drive unit is controlled/regulated by the control unit as a function of adjusting force comparison values stored in the storage medium, comprising the steps of:

enabling the adjusting device by the control unit to run through a predefined number of adjusting cycles within the initialization process, measuring a plurality of adjusting force values by the control unit at assigned actuating element positions along an adjusting path within individual adjusting cycles and storing the plurality of adjusting force values in the storage medium and determining adjusting force comparison values for assigned actuating element positions from a plurality of adjusting force values within the initialization process and storing the adjusting force comparison values in the storage medium.

The object can also be achieved by a method for adjusting the movement of an actuating element driven by a drive unit, comprising the steps of:

performing a predefined number of adjusting cycles within an initialization process, measuring a plurality of adjusting force values at assigned actuating element positions along an adjusting path within individual adjusting cycles and storing the plurality of adjusting force values, and determining adjusting force comparison values for assigned actuating element positions from a plurality of adjusting force values within the initialization process and storing the adjusting force comparison values.

The initialization process may only run through in the final assembly state of the adjusting device. The number of adjusting cycles to be run through within the initialization process can be predefined by a target value, to which it is decremented or incremented in defined stages from a start value after every completely run through adjusting cycle. The control unit may determine/evaluate the run-in state of the adjusting device based on the actuating force values of a plurality of consecutive adjusting cycles and may vary the number of adjusting cycles to be run through within the initialization process as required. In addition to the actuating force values at least one further operating or ambient parameter of the adjusting device can be measured by the control unit at at least one position on the adjusting path. The adjusting force comparison values may only be determined or stored, if the at least one further operating or ambient parameter does not deviate from a predefined standard value beyond predefined tolerance limits during the initialization process. The at least one further operating or ambient parameter can be used in the control unit to correct the actuating force comparison values determined in the respective initialization process and the corrected adjusting force comparison values can be stored. Initial, reverse and/or end positions within an adjusting cycle can be determined during the initialization process by bringing at least one actuating element of the adjusting device into contact with a mechanical fixed stop. Control functions for the cushioned or braked bringing into contact of the at least one actuating element with a mechanical fixed stop can be deactivated during the initialization process.

The object can further be achieved by an adjusting device comprising at least one power-activated actuating element, at least one drive unit, one transmission mechanism and at least one control unit, whereby the control unit controls/regulates the adjusting force generated by the drive unit as a function of adjusting force comparison values, wherein the control unit is connected electrically to at least one electronic storage medium, whereby the control unit determines adjusting force comparison values at defined positions within an initialization process and stores them in the storage medium.

In the case of the adjusting device, which comprises a power-activated actuating element, a control unit with at least on electronic storage medium and a drive unit, the adjusting force generated by the drive unit is controlled/regulated by the control unit as a function of the adjusting force comparison values stored in the storage medium. The initialization method and the adjusting device are characterized in that the control unit allows the adjusting device to run through a predefined number of adjusting cycles within an initialization process, a plurality of adjusting force values are measured by the control unit along an adjusting path and stored in the storage medium and adjusting force comparison values are determined from the adjusting force values within the initialization process and stored in the storage medium.

The advantages achieved with the invention are that an excessive actuating force or trapping force can be prevented with greater reliability during the power-activated adjusting of an actuating element.

BRIEF DESCRIPTION OF THE DRAWINGS

The invention and further advantageous embodiments of the invention are described in more detail below with the assistance of schematic illustrations in the drawing, in which.

Objects with the same function or significance have the same reference characters in the Figures.

DETAILED DESCRIPTION OF THE PREFERRED EMBODIMENTS

Figure 1:
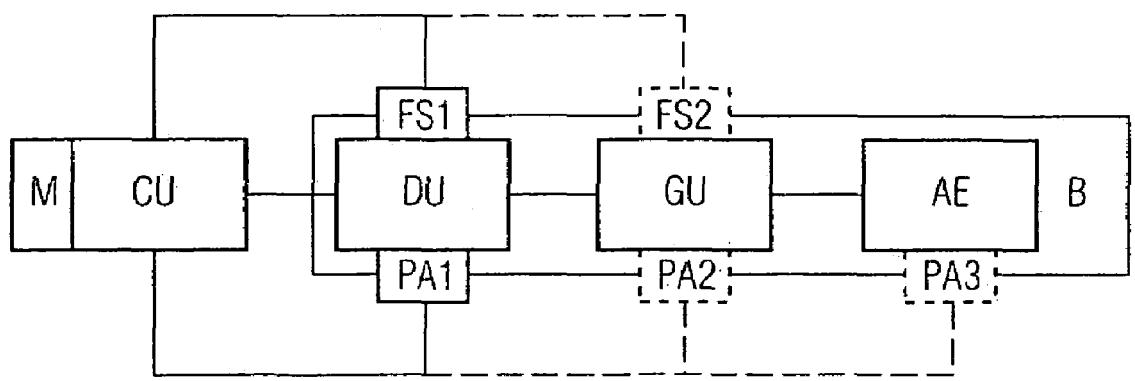
FIG. 1 shows a block circuit diagram of an inventive adjusting device with force/path measurement and a storage medium for storing adjusting force comparison values.

FIG. 1 shows a basic layout of an actuating device with actuating force/adjusting path monitoring in a block circuit diagram. The device comprises a control unit CU with a storage medium M, a drive unit DU, a transmission mechanism GU, an actuating element AE and an active system B.

An actuating force sensor FS1 and a path sensor PA1 as well as alternative arrangements for these two types of sensors are shown with the reference characters FS2, PA2 and PA3. When transferred to a window closing device for a motor vehicle, the drive unit DU corresponds to an electric motor, the transmission mechanism GU to a gear reducer on the electric motor and a lifting mechanism in the vehicle door, the actuating element AE to a side window and the active system B to a vehicle door with a frame, which is formed in some instances by a vehicle chassis.

The control unit can thereby be assigned directly to the electric motor or can be arranged centrally. The drive unit DU, the transmission mechanism GU and the actuating element AE are mutually connected and have a direct active connection to the surrounding active system.

The sensors for the actuating path and the actuating force can be attached at different points on the actuating device. The actuating force can be determined by the sensor FS1 directly at the drive unit DU for example via the motor power of an electric motor or by the sensor FS2, as for example elongation measurement lines, at appropriate points on the transmission mechanism GU. The corresponding actuating path can be determined by the sensor PA1 directly at the drive unit DU, for example by analyzing motor revolutions, the sensor PA2 at the transmission mechanism GU and by the sensor PA3 at the actuating element AE.

Figure 2:
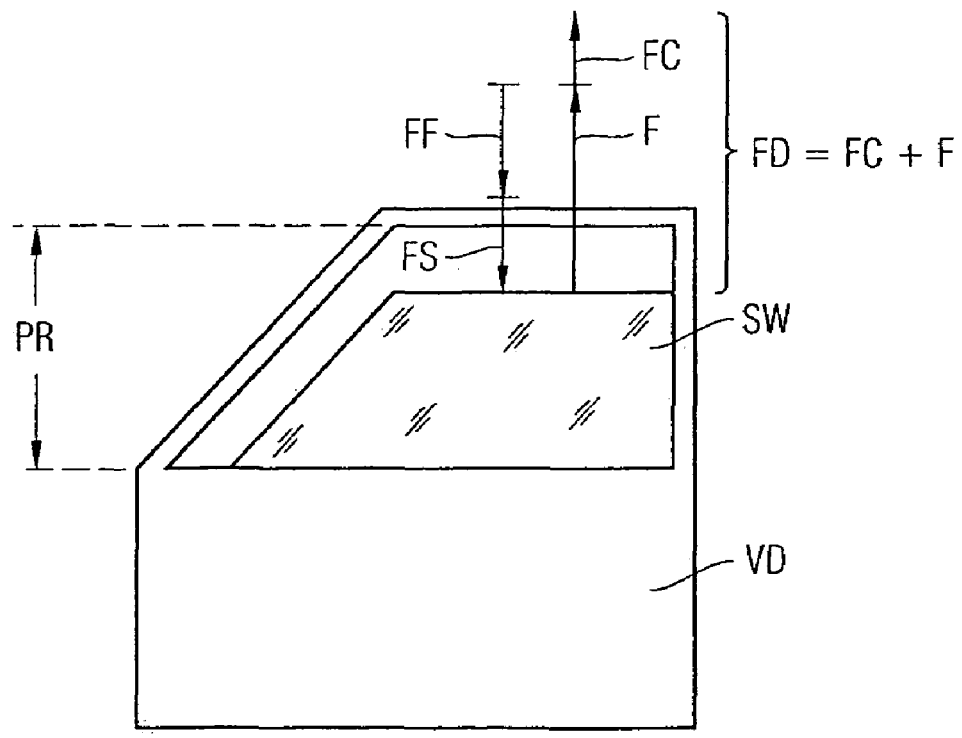
FIG. 2 shows a schematic layout of a window closing arrangement in a vehicle with the forces acting on the window.

FIG. 2 shows the layout of an actuating device with reference to a side window in a vehicle door VD. The adjusting range PR of the side window SW goes from "fully open" to "fully closed". The forces acting on the side window during the closing process are also shown. They are: the force of the weight of the window as a static counterforce FS, the friction force FF and the drive force FD, which is made up of the minimum required actuating force F and the trapping force FC.

Figure 3:
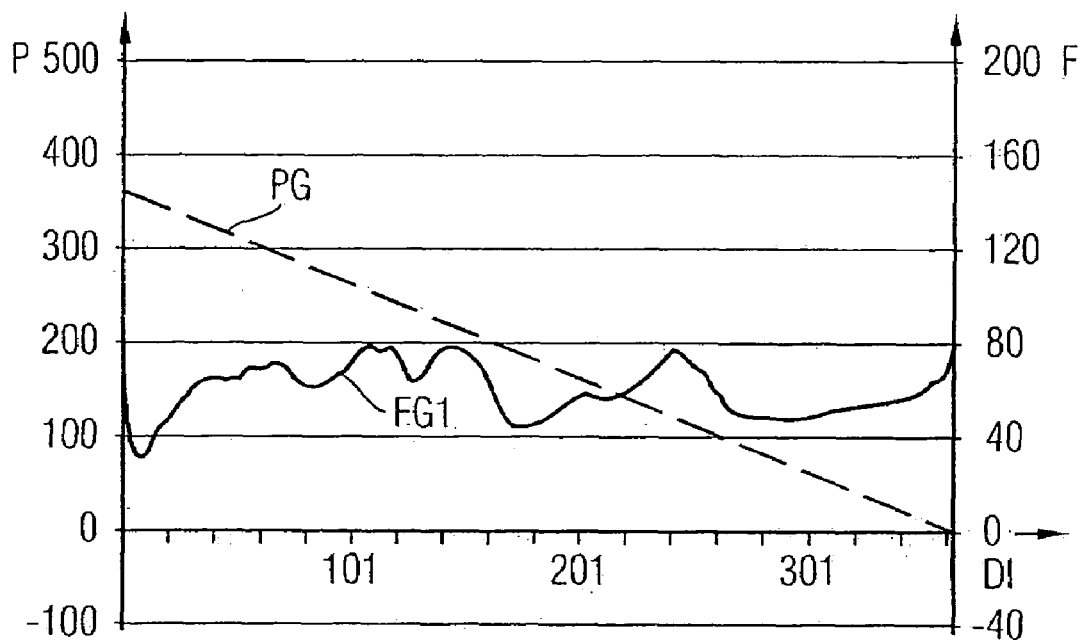
FIG. 3 shows a force/path diagram of a window closing arrangement, recorded during the first complete adjusting operation after commissioning.

An actuating force/actuating path diagram in FIG. 3 shows the position P of the actuating element/vehicle side window and the measured required actuating force F applied over the number of drive pulses DI, supplied by the drive. Only the adjusting operation from an initial position (fully open) of the actuating element to an end position (fully closed) is shown here, corresponding to the window closing process.

The actuating force graph FG1 shows the pattern of the actuating force F for the entire closing process within the first adjusting cycle. The actuating force here is applied over the number of drive pulses DI, which is related in a linear manner to the actuating path of the actuating element. This linear relationship is shown by the actuating element position graph PG illustrated, which indicates the position of the actuating element with the respective number of drive pulses DI. To record the actuating force graph PG, it is assumed that the movement of the actuating element is uniform. The actuating force graph FG1 shows an actuating force F that fluctuates significantly over the actuating path, which is due to tolerance fluctuations required by the manufacturing process in the drive and transmission mechanism and in come cases uneven distribution of lubricant.

Figure 4:
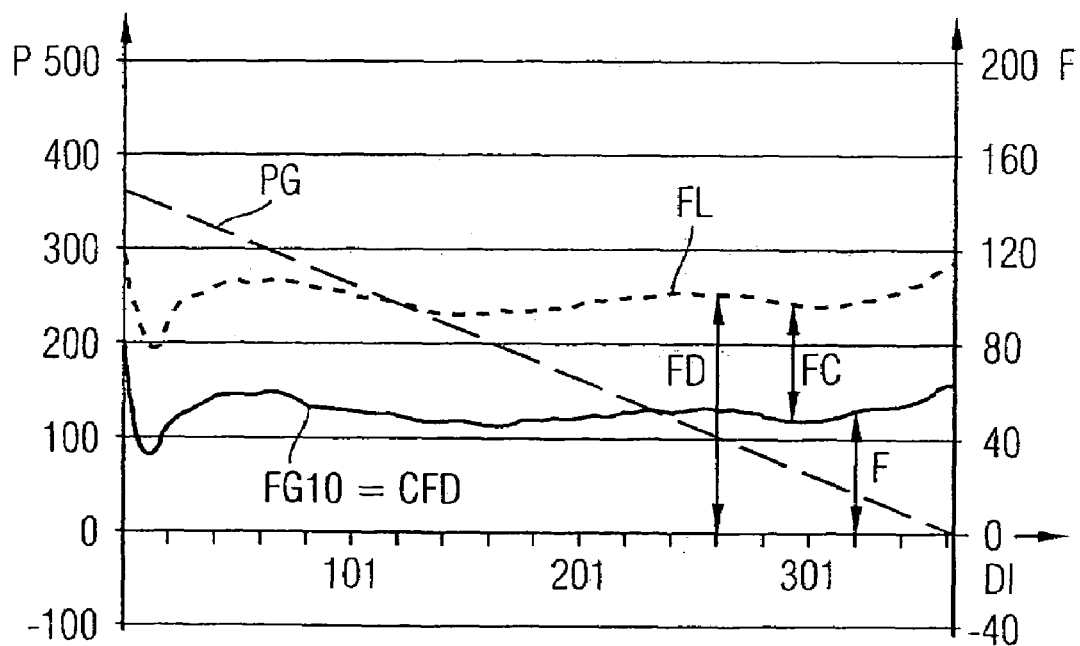
FIG. 4 shows a force/path diagram with adjusting force comparison characteristics recorded during the tenth complete adjusting operation after commissioning of the device and the associated actuating force upper limit.

FIG. 4 shows an actuating force/actuating path diagram with the same structure as the diagram in FIG. 3, for the same adjusting device. Here the actuating force F is however not recorded until the tenth complete adjusting cycle after commissioning as the actuating force graph FG10. Unlike the actuating force graph FG1 in FIG. 3, the actuating force fluctuations here are significantly smaller and the actuating force required is on average considerably smaller. This clearly indicates the run-in effect of the window closing mechanism, which is established here already after ten cycles. This run-in effect is based on the fact that the edges, burrs and roughness caused by the manufacturing process on drive or transmission parts moving against each other in some cases adjust to each other or smooth each other out. Also in some cases locally applied lubricant is distributed thereby ensuring a lower level of friction after a few adjusting cycles.

If we now assume that the fully run-in state is already achieved after the above-mentioned 10 cycles and no further changes will occur, at least individual values of this graph can be used and stored as adjusting force comparison values in relation to the respective position of the side window.

The device-specific adjusting force comparison values are determined and stored for each individual adjusting device within an initialization process. Lining up or connecting the individual adjusting forces along the adjusting path in turn produces an actuating force graph, which in some cases can be stored as the adjusting force comparison graph CFD.

This can be done, if the adjusting device is functional when premounted, for example as a modular unit. However the adjusting force comparison values are preferably determined in the final, run-in end assembly state of the overall system (e.g. window closing system), to ensure that all ambient influences are taken into account.

The actuating force graph FL is also shown in the diagram in FIG. 4. This actuating force graph FL is produced by adding the trapping force FC to every individual recorded adjusting force comparison value and then lining up or connecting the points thus calculated, as shown in FIG. 4. This determines the maximum permitted drive force FD for every point of the actuating path. If the actuating force currently measured in the operational adjusting process increases beyond this limit, a failure, e.g. trapping, is assumed and the drive is stopped or the drive direction is reversed.

Figure 5:
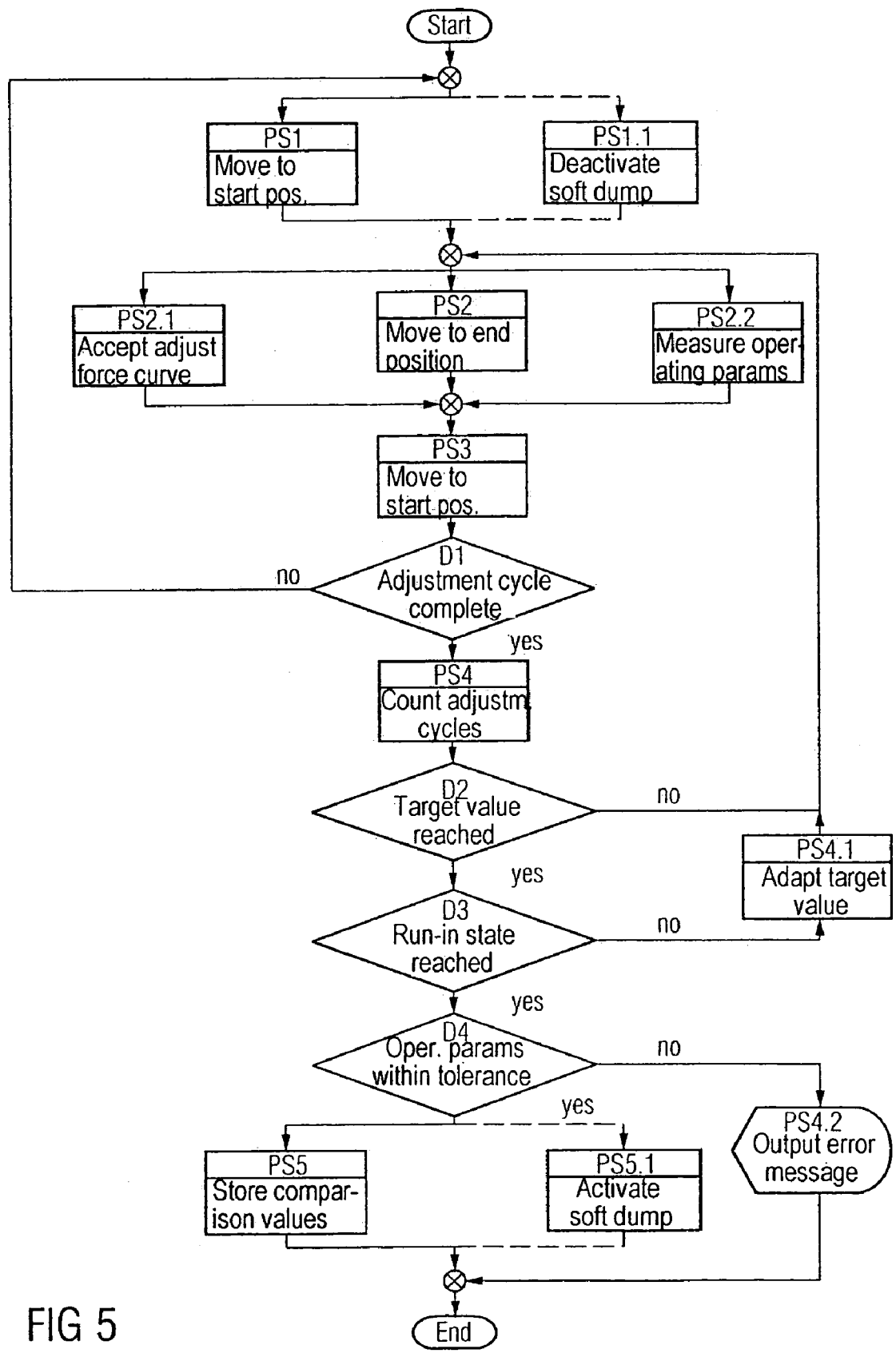
FIG. 5 shows a flow diagram of an initialization process for recording adjusting force comparison values.

FIG. 5 shows a simplified schematic flow diagram of a possible initialization process for recording the adjusting force comparison values. In this flow diagram the individual process stages are marked PS1 to PS5 and the decisions to be taken D1 to D4.

The initialization process is started automatically when the adjusting device is first commissioned.

Naturally the initialization process can also be called and run through for example after repair, replacement or as part of a routine customer service, again by control commands for this purpose. In this way the adjusting force comparison values can also be adjusted to changed ambient conditions and changing counterforces as a result of ageing.

After start-up a predefined number of run-in adjusting cycles is run through in full as per standard operation. An adjusting cycle thereby includes the adjusting of the actuating element from an initial position, e.g. "fully open" to the opposite end position on the actuating path, e.g. "fully closed" and back again to the initial position. For this it is first ensured in program stage PS1 that the actuating element is in the predefined initial position, by the drive moving the actuating element in the predefined direction to a mechanical end stop.

In the next program loop, which contains the program stages PS2, PS2.1, PS2.2, PS3, PS4 and the decisions D1 and D2, the predefined number of run-in adjusting cycles is run through. The program stage PS2 is started first. In this program stage the actuating element is moved by the drive at constant speed from the initial position to the opposite end position. At the same time in program stage PS2.1 the actuating force values and in program stage PS2.2 a further operating parameter, e.g. the drive temperature, are recorded and stored in a buffer.

Once the end position is reached, in program stage PS3 the actuating element is moved back to the initial position. In the subsequent decision stage D1 it is asked whether the adjusting cycle has been run through completely. If this is not the case, the program returns to program stage PS1 and the initialization process starts from the beginning.

If however the adjusting cycle has been run through completely, in the next program stage PS4 the number of adjusting cycles already run through completely is established and in the decision stage D2 it is compared with a predefined numerical run-in value. This numerical run-in value can thereby be decremented in stages to a target value, e.g. zero or a cycle counter at a start value, e.g. zero, can be incremented in stages up to the value of the numerical run-in value, starting after every completely run through adjusting cycle. As long as the predefined numerical value is not reached in decision stage D2, the process returns to program stage PS2 and the next adjusting cycle is started.

The predefined number of run-in adjusting cycles ensures that the entire system is in the run-in state when the adjusting force comparison values CFD are recorded. In this way all system-specific variables influencing the actuating force that is a function of the adjusting path are taken into account. The required minimum number of run-in adjusting cycles can differ depending on the nature and structure of the adjusting device and is defined for example during the development phase. By comparing the actuating force values of a plurality of consecutive adjusting cycles it can be determined and assessed whether the system is already in the run-in state or still in the area of significant actuating force changes. If, after a predefined number of run-in cycles, the run-in state has not yet been reached, which is verified in decision stage D3, the controller can in some instances automatically increase the number of run-in adjusting cycles, as predefined in program stage PS4.1, or restart the initialization process.

If the run-in state is reached in decision stage D3, it is verified in the subsequent decision stage D4 whether the actuating force values recorded in the initialization process are valid.

This program stage is particularly recommended, when, depending on the nature of the drive unit, the force transmission mechanism or the mechanism for guiding the actuating element, the required actuating force is also a function of further ambient parameters, which in turn can be subject to fluctuations. Also the response of the measurement value sensor or measuring method used to measure the actuating force or the actuating path can influence at least the measurement values supplied. For example the ambient temperature, air humidity, operating temperature of individual device components or the spatial position of the device in relation to the force of gravity can have a significant influence on the counterforces inherent in the system or the said measurement values.

When recording the actuating force values in particular, which are to be stored as adjusting force comparison values, it should therefore be ensured that measurement takes place under standardized conditions. To ensure said conditions, further parameters can be recorded using the same measuring method. These measurement values are then used within the initialization routine during the validity test in decision stage D4 to assess the conditions.

If the measurement values are within defined tolerance limits, the validity test in decision stage D4 indicates that the actuating force values are valid. In the next program stage PS5 the actuating force values are then stored as adjusting force comparison values and the initialization routine is completed.

If measurement values are outside the defined tolerance limits, the recorded actuating force values are deemed to be invalid and are not stored as adjusting force comparison values. An error report is then output in program stage PS4.2. Alternatively, if the influence of the relevant operating parameter on the actuating force pattern is known precisely, an arithmetic correction of the actuating force values can in some cases be carried out as a function of the value of the relevant operating parameter, before these are stored as adjusting force comparison values.

The actuating force values recorded in each instance during the last run-in cycle can be used as adjusting force comparison values, as in FIG. 4. However actuating force comparison values can also be determined from a number of actuating force values measured in a plurality of adjusting cycles, e.g. by creating a mean value or by extrapolation. A representative adjusting cycle can also be selected by comparing the actuating force values of a plurality of consecutive run-in adjusting cycles and in some cases by filtering out erratic values and its actuating force values can be used as adjusting force comparison values.

If validity is agreed, the actuating force comparison values thus determined are stored in the storage medium and the initialization process is terminated.

In standard operation of the adjusting device additional control functions, for example what are known as "soft dump functions" can be deployed when controlling the adjusting device. Such a function can cause the actuating element to slow down before it comes into contact with a mechanical end stop so that it reaches its end position gently. When recording an actuating force graph within the initialization process such functions can have a falsifying effect on the actuating force values to be recorded. For this reason such functions can be deactivated at or before the start of program stage PS1 within the initialization routine in program stage PS1.1 and reactivated on or after completion of program stage PS5 in program stage PS5.1.

The invention claimed is:

1. A method for initializing an adjusting device, which comprises a power-activated actuating element, a control unit with at least one electronic storage medium and a drive unit, whereby an adjusting force generated by the drive unit is controlled/regulated by the control unit as a function of adjusting force comparison values stored in the storage medium, comprising the steps of:
   enabling the adjusting device by the control unit to run through a predefined number of adjusting cycles within an initialization process,
   measuring a plurality of adjusting force values by the control unit at assigned actuating element positions along an adjusting path within individual adjusting cycles and storing the plurality of adjusting force values in the storage medium and
   determining adjusting force comparison values for assigned actuating element positions from a plurality of adjusting force values within the initialization process and storing the adjusting force comparison values in the storage medium wherein the number of adjusting cycles to be run through within the initialization process is predefined by a target value, to which it is decremented or incremented in defined stages from a start value after every completely run through adjusting cycle.

2. A method for initializing an adjusting device, which comprises a power-activated actuating element, a control unit with at least one electronic storage medium and a drive unit, whereby an adjusting force generated by the drive unit is controlled/regulated by the control unit as a function of adjusting force comparison values stored in the storage medium, comprising the steps of:
- enabling the adjusting device by the control unit to run through a predefined number of adjusting cycles within an initialization process,
- measuring a plurality of adjusting force values by the control unit at assigned actuating element positions along an adjusting path within individual adjusting cycles and storing the plurality of adjusting force values in the storage medium and
- determining adjusting force comparison values for assigned actuating element positions from a plurality of adjusting force values within the initialization process and storing the adjusting force comparison values in the storage medium wherein in addition to actuating force values at least one further operating or ambient parameter of the adjusting device is measured by the control unit at at least one position on the adjusting path, wherein the adjusting force comparison values are only determined or stored, if the at least one further operating or ambient parameter does not deviate from a predefined standard value beyond predefined tolerance limits during the initialization process.

3. The method according to claim 2, wherein the at least one further operating or ambient parameter is used in the control unit to correct actuating force comparison values determined in a respective initialization process and corrected adjusting force comparison values are stored.

4. A method for initializing an adjusting device, which comprises a power-activated actuating element, a control unit with at least one electronic storage medium and a drive unit, whereby an adjusting force generated by the drive unit is controlled/regulated by the control unit as a function of adjusting force comparison values stored in the storage medium, comprising the steps of:
- enabling the adjusting device by the control unit to run through a predefined number of adjusting cycles within an initialization process,
- measuring a plurality of adjusting force values by the control unit at assigned actuating element positions along an adjusting path within individual adjusting cycles and storing the plurality of adjusting force values in the storage medium and
- determining adjusting force comparison values for assigned actuating element positions from a plurality of adjusting force values within the initialization process and storing the adjusting force comparison values in the storage medium, wherein initial, reverse and/or end positions within an adjusting cycle are determined during the initialization process by bringing at least one actuating element of the adjusting device into contact with a mechanical fixed stop wherein control functions for cushioned or braked bringing into contact of the at least one actuating element with a mechanical fixed stop are deactivated during the initialization process.

5. A method for adjusting the movement of an actuating element driven by a drive unit, comprising the steps of:
- performing a predefined number of adjusting cycles within an initialization process,
- measuring a plurality of adjusting force values at assigned actuating element positions along an adjusting path within individual adjusting cycles and storing the plurality of adjusting force values, and
- determining adjusting force comparison values for assigned actuating element positions from a plurality of adjusting force values within the initialization process and storing the adjusting force comparison values, wherein the number of adjusting cycles to be run through within the initialization process is predefined by a target value, to which it is decremented or incremented in defined stages from a start value after every completely run through adjusting cycle.

6. A method for adjusting the movement of an actuating element driven by a drive unit, comprising the steps of:
- performing a predefined number of adjusting cycles within an initialization process,
- measuring a plurality of adjusting force values at assigned actuating element positions along an adjusting path within individual adjusting cycles and storing the plurality of adjusting force values, and
- determining adjusting force comparison values for assigned actuating element positions from a plurality of adjusting force values within the initialization process and storing the adjusting force comparison, wherein in addition to actuating force values at least one further operating or ambient parameter of the adjusting device is measured at at least one position on the adjusting path, wherein the adjusting force comparison values are only determined or stored, if the at least one farther operating or ambient parameter does not deviate from a predefined standard value beyond predefined tolerance limits during the initialization process.

7. A method for adjusting the movement of an actuating element driven by a drive unit, comprising the steps of:
- performing a predefined number of adjusting cycles within an initialization process,
- measuring a plurality of adjusting force values at assigned actuating element positions along an adjusting path within individual adjusting cycles and storing the plurality of adjusting force values, and
- determining adjusting force comparison values for assigned actuating element positions from a plurality of adjusting force values within the initialization process and storing the adjusting force comparison, wherein in addition to actuating force values at least one further operating or ambient parameter of the adjusting device is measured at at least one position on the adjusting path, wherein the at least one further operating or ambient parameter is used to correct actuating force comparison values determined in a respective initialization process and the corrected adjusting force comparison values are stored.

8. A method for adjusting the movement of an actuating element driven by a drive unit, comprising the steps of:
- performing a predefined number of adjusting cycles within an initialization process,
- measuring a plurality of adjusting force values at assigned actuating element positions along an adjusting path within individual adjusting cycles and storing the plurality of adjusting force values, and determining adjusting force comparison values for assigned actuating element positions from a plurality of adjusting force values within the initialization process and storing the adjusting force comparison values, wherein initial, reverse and/or end positions within an adjusting cycle are determined during the initialization process by bringing at least one actuating element of the adjusting device into contact with a mechanical fixed stop, wherein control functions for a cushioned or braked bringing into contact of the at least one actuating element with a mechanical fixed stop are deactivated during the initialization process.

* * * * *